Oct. 7, 1941.   H. D. MENOHER   2,258,121
MANUFACTURE OF SHEET GLASS
Filed May 10, 1938

INVENTOR
Harrison Dean Menoher

Patented Oct. 7, 1941

2,258,121

UNITED STATES PATENT OFFICE 2,258,121

MANUFACTURE OF SHEET GLASS

Harrison Dean Menoher, Jeannette, Pa., assignor to American Window Glass Company, Pittsburgh, Pa., a corporation of Pennsylvania Application May 10, 1938, Serial No. 207,029

6 Claims. (Cl. 49—17)

The present invention relates broadly to the manufacture of sheet glass by substantially continuous drawing from a bath of molten glass. More particularly, it relates to apparatus whereby sheet glass may be continuously drawn from a bath of molten glass without the presence therein of all of the waves and batter which have been heretofore characteristic of drawn glass. The product of the present invention is freer of such defects than the products manufactured commercially heretofore.

In the various commercial processes of manufacturing sheet glass as practiced heretofore, the glass is drawn vertically from a bath of molten glass in a drawing pit or chamber, the molten glass being fed to the drawing chamber either directly from a melting furnace or through canals connecting the melting furnace and the various drawing chambers. In some of these processes the glass sheet is drawn vertically from the bath past setting means and then continues vertically throughout the drawing chamber and into the base of a vertically extending lehr at the top of which the rising glass sheet is cut to appropriate size. In at least one of these processes the glass sheet is drawn from the molten glass past setting apparatus and while still in the drawing chamber is turned horizontally over a roll and then passes horizontally through an appropriate cooling lehr at the end of which the continuous sheet is cut to appropriate size. In some of such processes the glass sheet is drawn upwardly from a slot in a floater or debiteuse positioned at the surface of the glass bath in the drawing chamber, while in other processes the sheet is drawn directly from the surface of the bath either with or without the use of a submerged forming bar. The present invention is applicable to any of these known processes or to any other process wherein the glass sheet is formed by substantially continuous drawing from a bath of molten glass.

In all of these processes as practiced heretofore, the glass produced has a characteristic wave extending longitudinally and, in some cases, laterally, of the rising glass sheet. This wave is objectionable in view of the fact that it causes distortion of objects viewed therethrough. In addition to this defect, the product resulting from the practice of any of the aforesaid processes has heretofore been objectionable from the standpoint of batter. Batter likewise causes distortion of objects viewed through the glass sheet, and this is particularly true where the objects are viewed at a relatively sharp angle therethrough.

The temperature conditions prevailing in the glass bath, in the rising glass sheet, in the floater or debiteuse, where used, and in the atmosphere adjacent the glass bath and the rising glass sheet materially affect the character of the resulting product and the effective length of the drawing period. It is, therefore, desirable to control or regulate these temperature conditions and also to control or regulate the movement of the atmosphere in the drawing pit adjacent the glass bath and the rising glass sheet.

In the co-pending application of Frederic L. Bishop and Laurence P. Forman, Serial No. 208,850, filed May 19, 1938, there is shown and described a method and apparatus whereby control and regulation of these temperatures and atmospheric conditions can be effected. However, I have found that there are certain drawbacks to the system of control disclosed and claimed in that application. For example, considerable difficulty is encountered where bricks are used as the cooling retarding and heat equalizing means, in that such bricks will disintegrate to some extent under the high temperatures to which they are subjected with the result that dirt may be deposited on the surface of the glass bath which may ultimately find its way into the finished product. Furthermore, I have found that better heat equalization in the bath and debiteuse and, consequently, in the rising glass sheet, can be accomplished where heat conducting or distributing members, which will effectively conduct heat from one position of the bath or debiteuse to another, are used. I have also found that still better results can be accomplished where the heat conducting or distributing members extend throughout substantially the entire area of the pit between each cooler and the adjacent side-wall and longitudinally of the pit throughout at least the width of the rising glass sheet and preferably throughout the entire length of the pit. I have also found it desirable to provide heat conducting or distributing members extending transversely of the pit between the longitudinally extending heat conducting or distributing members adjacent each end of the drawing pit. I have also found that better results can be obtained where the longitudinally extending heat conducting or distributing members have polished reflecting surfaces.

In addition to materially reducing waves and batter in the resulting product where the present invention is used, the drawing period will be materially lengthened. As is well known, in the ordinary drawing of glass sheets the temperature of the glass bath constantly decreases. This is due to the fact that normally no additional heat sufficient to prevent the cooling of the glass in the drawing pit is supplied thereto. As soon as the glass in the drawing pit becomes sufficiently cool to prevent the further satisfactory drawing of glass, it is necessary to shut down the machine and recondition the glass before further drawing can be carried out. In addition to controlling or regulating the cooling of the glass bath so as to render it more uniform, the use of the present invention materially retards the cooling of the glass in that the heat conducting or distributing members prevent the escape of heat from the molten glass or reflect escaped heat back into the molten glass.

In the accompanying drawing I have shown a preferred embodiment of my invention. It will be understood, however, that my invention is not limited to the specific apparatus shown in the drawing, as it may be otherwise embodied and entirely suitable results obtained.

Figure 1:
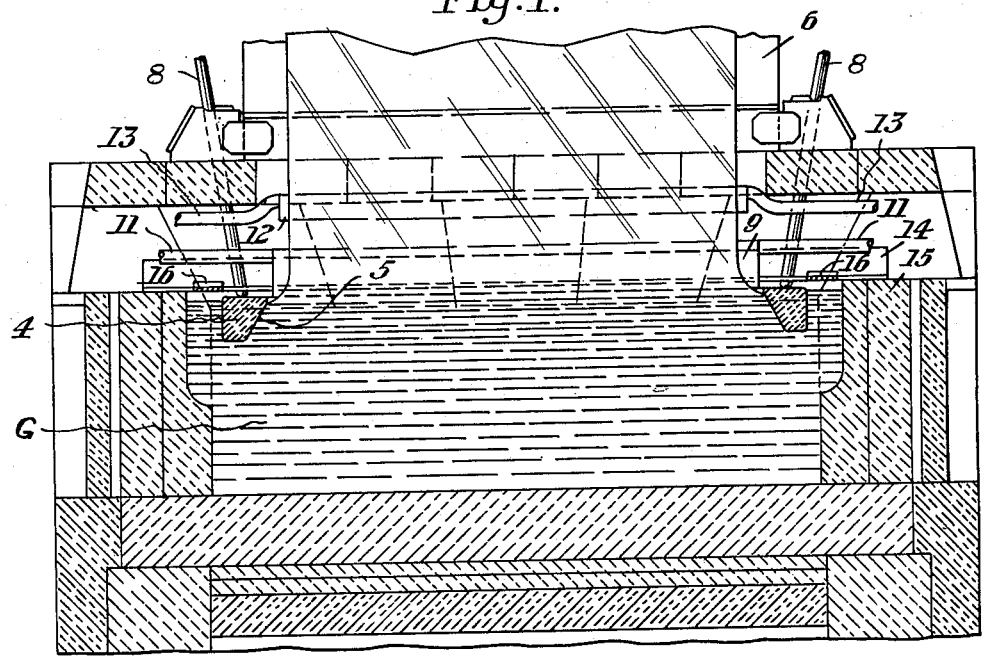
Figure 1 is a longitudinal section through a drawing pit embodying appropriate apparatus for carrying out my invention.
Figure 2:
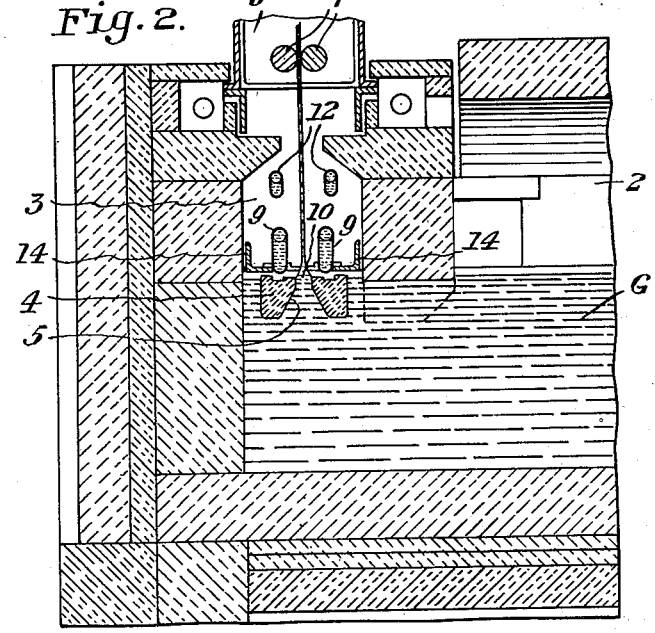
Figure 2 is a transverse section through the drawing pit shown in Figure 1, showing a small portion of the canal leading to the drawing pit.
Figure 3:
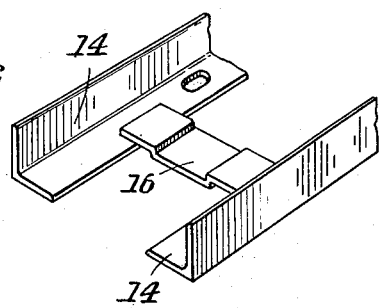
Figure 3 is a partial perspective view of the arrangement of the angles shown in Figures 1 and 2.

In the structure shown in the drawings the molten glass G is fed from the canal 2 into the drawing pit 3. A debiteuse or floater 4 is provided in the drawing pit and the molten glass is drawn in the usual manner upwardly through the slot 5 in the debiteuse through the drawing pit 3 and into the lehr 6 in which a plurality of rollers 7 is provided for causing the glass to travel upwardly through the vertically extending lehr. The floater or debiteuse 4 is held in position in the usual manner by presser bars 8 which extend downwardly into the drawing pit. A water cooler 9 is provided on each side of the longitudinally extending opening or slot 5 in the debiteuse and these coolers are positioned adjacent the meniscus indicated generally by the reference character 10 for the purpose of cooling and setting the molten glass into sheet form. These coolers are provided with pipes 11 for supplying water thereto and for discharging water therefrom. Positioned above the main coolers 10 are similar auxiliary coolers 12 which are used for the purpose of cooling the sheet and aiding in the proper annealing thereof. These coolers are likewise provided with inlet and outlet pipes 13.

A longitudinally extending angle 14 is provided between each main cooler 9 and the adjacent side wall of the drawing pit. These angles 14 extend from one end of the drawing pit to the other and are adapted to rest on the end blocks 15 of the drawing pit. Each angle is provided with a vertically extending leg and a horizontally extending leg. The horizontally extending leg of each angle abuts the adjacent cooler and extends from the cooler toward the adjacent side wall and the vertically extending leg of each angle extends vertically along the adjacent side wall and is spaced a relatively slight distance therefrom. Each angle is located a short distance above the debiteuse and above the molten glass in the pit. Adjacent each end of the angles there is provided a cross bar 16 which rests upon the horizontally extending legs of the angles and bridges from one angle to the other. These cross bars are positioned adjacent the end of the debiteuse between the debiteuse and the adjacent end wall and are for the purpose of reducing the circulation of air from the ends toward the center of the rising glass sheet and between the debiteuse and the coolers; that is, these cross bars aid in preventing a longitudinal flow of air along the rising glass sheet adjacent the meniscus. These cross bars also materially aid in maintaining uniform temperatures in the glass and the debiteuse from one end of the pit to the other. They also serve to heat some of the air circulating in the pit and render the air which comes in contact with the meniscus more uniform in temperature throughout the length of the pit. It will be understood, however, that these cross bars are not essential and that entirely satisfactory results can be obtained where they are not utilized.

By placing the angles in the manner described, that is, with the horizontal leg in contact with the adjacent cooler, a seal is effected between the two which effectively reduces the amount of air which contacts the meniscus of the sheet. Any air passing between the coolers and the glass bath is caused to contact the angles and the temperature therefore at least partially equalized.

It will be understood that the angles and the cross bars 16 must be made of a material which will withstand the extremely high temperatures which prevail in the drawing pit. The molten glass is normally between 1800 and 1900° F. and consequently a material which will withstand such temperatures must be utilized. I prefer to make the angles of a metal such as stainless steel which is capable of withstanding these temperatures. I have found that the nickel-chromium-steel alloy which is sold under the trade name of Duraloy metal will satisfactorily withstand the temperatures and will perform the desired functions.

I prefer to have the outer surfaces of the angles ground and polished as, in general, better results are obtained where the faces of the angles adjacent the side walls of the pit and the faces adjacent the molten glass and the debiteuse are ground and polished to a relatively high luster. It will be understood, however, that the character of these surfaces may be modified and may differ at various points on the angles in order to attain the desired results. For example, the portions of the angles adjacent the center of the pit may be blackened whereas the end portions of the angles may be given a high polish so that the center portion will absorb a greater quantity of heat than the end portions.

It will also be apparent that instead of angles of the character disclosed, flat metal bars or channels or I-beams may be utilized and advantageous results obtained. In addition it will also be apparent to those skilled in the art that the amount of metal adjacent any particular point along the width of the rising glass sheet may be of any desired thickness in order to take care of the particular temperature conditions existing in the pit. For example, the central portion of the angles or channels or bars or beams may be lighter than the end portions so as to regulate the flow of heat in the angles, etc. so as to obtain greater uniformity of temperature throughout the length of the meniscus.

As has been pointed out above, the arrangement described above regulates or controls the temperatures in the glass bath, the debiteuse and the meniscus of the rising glass sheet. The temperatures from one end of the debiteuse to the other are rendered more uniform and the debiteuse and the glass cool at a relatively uniform rate. In addition, the angles reflect a substantial amount of heat back into the glass bath and on the debiteuse and decrease the rate of cooling thereof so that the drawing period is lengthened somewhat. Furthermore, the arrangement described materially aids in the control of flow of air currents adjacent the meniscus and regulates the temperature of the air striking the meniscus so that a lesser quantity of air than is usual strikes the meniscus and so that the air which does come in contact with the meniscus is of relatively uniform temperature, whereby the cooling of the rising glass sheet is more uniform throughout the length of the meniscus. As the angles extend into abutting relation with the coolers, they block or prevent any substantial amount of air currents from passing downwardly along the outer faces of the coolers and inwardly toward the meniscus. Only a small amount of air passes downwardly between the angles and the side-walls of the pit and any air which does circulate in this manner will be heated substantially uniformly by virtue of its contact with the angles so that when the air does strike the meniscus it will be of relatively uniform temperature from one edge of the sheet to the other.

In the foregoing specification I have used the words "waves" and "batter." By these expressions I refer to any of the defects in the glass which produce distortion of objects when viewed therethrough except stones, seeds, blisters, catseyes and like defects.

While I have described my invention as applied to the Fourcault method of manufacturing sheet glass, it will be understood that it may be applied to any of the other known processes or may otherwise be embodied within the scope of the appended claims.

I claim:

1. Apparatus for drawing sheet glass comprising a drawing pit adapted to receive a bath of molten glass therein, means for continuously drawing a sheet of glass therefrom, a cooler on each side of the drawn glass sheet adjacent thereto for cooling and setting the molten glass into sheet form and at least one heat conducting member abutting a cooler and extending from the cooler substantially to the adjacent side wall of the pit and extending longitudinally of the drawing pit for rendering substantially uniform the temperature of the glass sheet at the meniscus from one edge to the other edge thereof and for at least partially shielding the meniscus against the in-flow of air beneath the cooler toward the meniscus.

2. Apparatus for drawing sheet glass comprising a drawing pit adapted to receive a bath of molten glass therein, means for continuously drawing a sheet of glass therefrom, a slotted debiteuse through which the molten glass is drawn, a cooler on each side of the drawn glass sheet adjacent thereto for cooling and setting the molten glass into sheet form and at least one heat conducting member abutting a cooler and extending from the cooler substantially to the adjacent side wall of the pit and extending longitudinally of the pit throughout the width of the rising glass sheet.

3. Apparatus for drawing sheet glass comprising a drawing pit adapted to receive a bath of molten glass therein, means for continuously drawing a sheet of glass therefrom, a cooler on each side of the drawn glass sheet adjacent thereto for cooling and setting the molten glass into sheet form, and a heat conducting member in abutting relation with each cooler and extending from the cooler to the adjacent side wall of the pit and longitudinally of the drawing pit for rendering more uniform the temperatures prevailing in the meniscus of the rising glass sheet and for shielding the meniscus against the in-flow of air beneath the coolers toward the meniscus.

4. Apparatus for drawing sheet glass comprising a drawing pit adapted to receive a bath of molten glass therein, means for continuously drawing a sheet of glass therefrom, a cooler on each side of the drawn glass sheet adjacent thereto for cooling and setting the molten glass into sheet form, a heat conducting member in abutting relation with each cooler and extending from the cooler to the adjacent side wall of the pit and longitudinally of the drawing pit for rendering more uniform the temperatures prevailing in the meniscus of the rising glass sheet and for shielding the meniscus against the inflow of air beneath the coolers toward the meniscus, and additional heat distributing members extending between the aforesaid heat conducting members adjacent each edge of the rising glass sheet.

5. Apparatus according to claim 3 in which the heat conducting members are of angular form and have vertically extending portions adjacent the side walls of the drawing pit.

6. Apparatus according to claim 3 in which each heat conducting member has a heat reflecting surface facing the bath of molten glass in the drawing pit.

H. DEAN MENOHER.